United States Patent [19]
Van Horne et al.

[11] 3,803,414
[45] Apr. 9, 1974

[54] STANDARDIZATION OF INFRARED MEASURING SYSTEM

[75] Inventors: William E. Van Horne; Paul Williams, both Columbus, Ohio

[73] Assignee: Infra Systems, Inc., Columbus, Ohio

[22] Filed: July 26, 1972

[21] Appl. No.: 275,144

[52] U.S. Cl. .................................. 250/339, 250/341
[51] Int. Cl. .............................................. G01t 1/16
[58] Field of Search........ 250/83 C, 83.3 H, 83.3 D, 250/339, 341

[56] References Cited
UNITED STATES PATENTS
2,951,161  8/1960  Foster et al. ...................... 250/83 C
3,631,526  12/1971  Brunton ......................... 250/83.3 H
3,614,450  10/1971  Hill et al. ...................... 250/83.3 H
3,681,595  8/1972  Dahlin ............................ 250/83 C Primary Examiner—Archie R. Borchelt
Assistant Examiner—Davis L. Willis

[57] ABSTRACT

A standardization method and apparatus for maintaining the accuracy of a source of radiation and a detector in the infrared spectral band used to measure a variable component or constituent in relation to a standard. Specifically standardization method and apparatus is disclosed whereby routine standardization of the system is effected through the correlation of the reflected radiation from a secondary standard to that of the working surface with the exclusion of the radiation from the backing surface or the measured sheet. Alternative apparatus for standardization and a preferred embodiment are shown and described.

5 Claims, 5 Drawing Figures

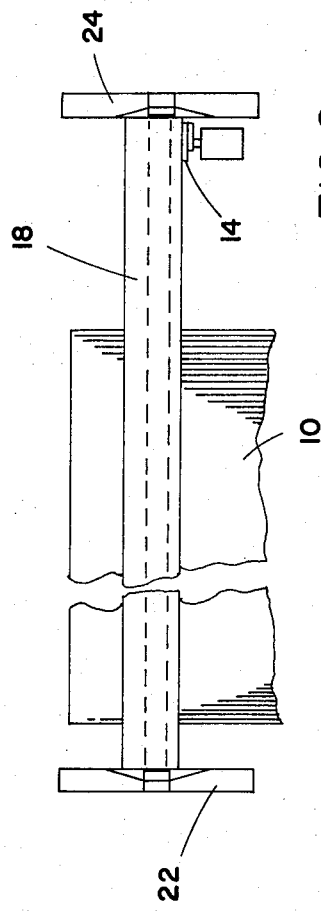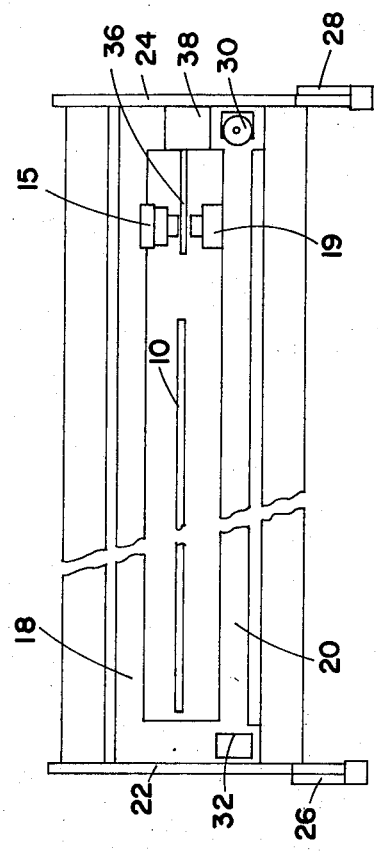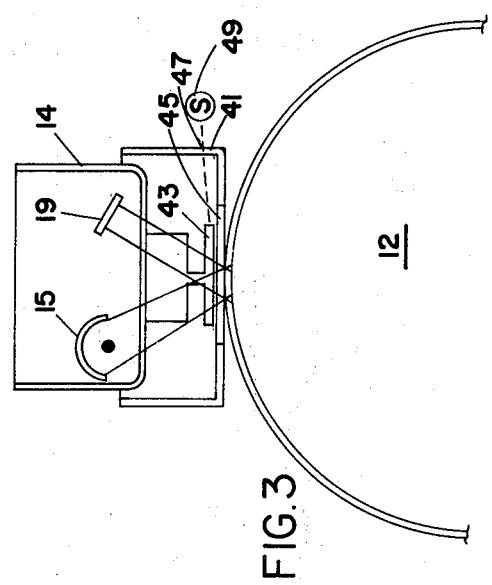

STANDARDIZATION OF INFRARED MEASURING SYSTEM

BACKGROUND AND CROSS REFERENCE

The absorption spectrum of a substance is the curve of values representing the percentage of light absorbed by the material at various wavelengths as the spectrum is swept in frequency. The amount of light energy absorbed at a particular wavelength represents a unique characteristic property of a substance. The absorption is related to the logarithm of the inverse of the transmission characteristic of the substance, while the spectrogram of the transmission characteristic is often termed the absorption spectrum. Absorption spectra can be used in the analysis of unknown mixtures by the plotting of the complete spectrum and making measurements upon it or, more commonly, making direct measurements of the light transmission characteristics at selected wavelengths at which characteristic absorption occurs.

A typical infrared measuring system will comprise, e.g., for the measurement of the thickness of a plastic sheet, an inspection head comprising a source and detector positioned near a roll or other support means over which the sheet travels. Radiation from the source is absorbed by the sheet and the unabsorbed energy is reflected from the roll or other support means back through the sheet again into the detector. The sheet itself may also reflect some radiation from its front surface directly into the detector.

In other systems the detector is positioned on the opposite side of the sheet from that of the source. Still in other systems although either the reflection or transmission properties are observed, the scattering effect inherent with the use of infrared radiation is that detected and utilized. Such systems are shown and described in U.S. Pat. No. 3,631,526 and co-pending patent application Ser. No. 880,543.

It has been found that infrared measuring systems making measurements by reflection or scattering measurements are particularly susceptible to "drifting" of the output signal because of the small energy generally present in the detected signal. This condition is true, for example, in an infrared gauge measuring plastic sheet thickness or moisture content of paper when the absorption coefficient is low and the sensitivity requirement high.

SUMMARY OF INVENTION

A "standardizing flag" or "standard surface" is employed for periodic standardization of an infrared guaging system employing a measuring head that continuously traverses the sheet under measurement. Automatic means positions the inspection head over the standard surface so that a useful intensity of radiation is reflected into the detector. The reflective characteristics of the standard surface are the same as those of the working surface. The instrument is initially standardized with the inspection head positioned over the surface sheet. The head is then immediately positioned over the standard surface to determine the relationship between the reflectivity of the working surface and that of the standard surface. In the preferred embodiment of the invention, the head is maintained over the working surface and a movably-mounted vane is moved over the exit aperture of the head — the back side of the vane having the standard surface. A standardization circuit automatically adjusts the measuring circuit of the instrument, while the vane is over this aperture so that it compensates for any error-producing changes which have occurred.

OBJECTS

It is the principal object of this invention to provide means for maintaining the accuracy of an infrared measuring system adapted to measure a variable about a datum or a mean by the use of standardization.

It is further object to provide such means whereby an instrument of the type described can be compensated for error in the measured variables through the use of a reference standard.

It is also an object to provide standardization means whereby a reflection-type infrared system can be standardized periodically without movement of the measuring head to an off-sheet position.

Further objects and advantages of the present invention will become apparent in the following detailed specification when taken together with appended drawings in which:

BRIEF DESCRIPTION OF DRAWINGS

FIG. 1 is a side elevation view showing in schematic form an infrared measuring system and FIG. 2 is a plain view of an infrared measuring system; both views being illustrative of the apparatus wherein the present invention has utility.

FIG. 3 is a preferred embodiment of a reflection type system with a standardizing flag incorporating a shutter or vane.

DETAILED DESCRIPTION OF THE DRAWINGS

Figure 4:
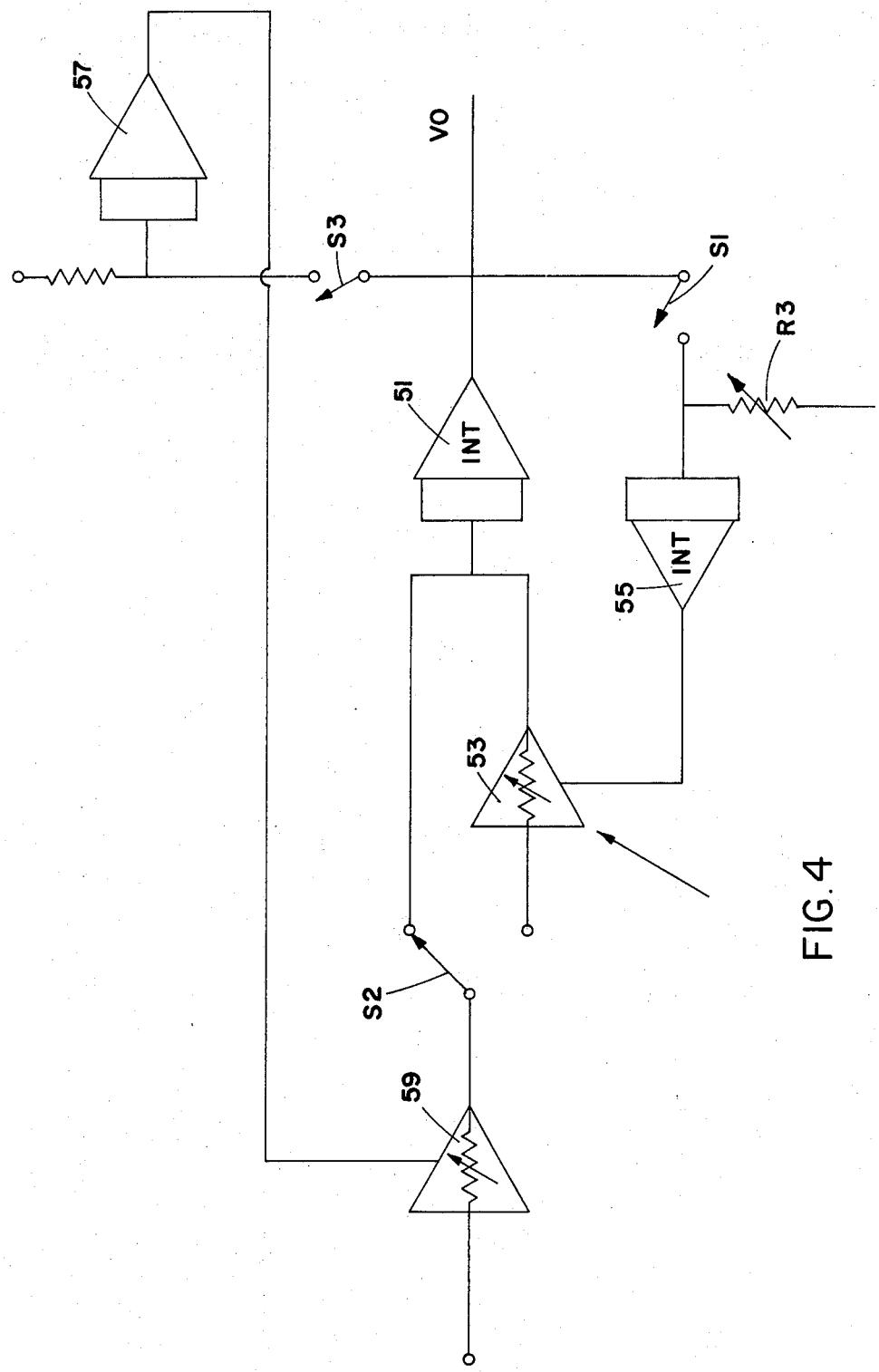
FIG. 4 is a simplified electrical schematic diagram showing preferred circuitry for periodic standardization.

With a particular reference to the apparatus illustrated in FIG. 1, the material under measurement is a travelling web 10 of sheet material, such as plastic film. The web 10 may be measured at any suitable point. The measuring head includes a light source 15 and a detector 19.

Light source 15 is preferably a broad-band frequency source and is operable to emit radiation across the entire infrared spectrum. As well known to the art, particular defined wavelengths of the radiation within the spectrum are absorbed to a greater extent than others by specific properties of the film. In the instant preferred embodiment, the particular property to be measured and evaluated is the thickness of the plastic film, and the frequency selected from the spectrum as a measure of thickness will thus be one whose wavelength is subjected to marked absorption by the plastic material, but is affected to a lesser extent by other properties of constituents of the film. The reference frequency is affected to a lesser extent than the absorption frequency by the plastic material, but is preferably affected by other characteristics to the same extent as the absorption frequency. This is also treated in copending patent applications Ser. No. 242,730, filed Apr. 10, 1972; Ser. No. 260,695, filed June 7, 1972; and Ser. No. 261,014, filed June 8, 1972.

With continued reference to FIG. 1 and also in FIGS. 2 and 3, adjacent the light source 15 — and intermediate thereof with the sheet 10 — is a plurality of infrared filters (not shown). Each of these filters has a pass band to permit a narrow band of radiation to strike the web 10 and then be back-scattered or reflected as shown in FIGS. 2 and 3 or transmitted therethrough as shown in FIG. 1 and detected by a detector 19. The gauge in FIG. 2 comprises an inspection head 14 containing the infrared source 15 and the detector 19. The head 14 is supported in measuring relation to the plastic sheet 10 and includes bearing means for permitting traversing movement of the head 14 parallel to the roll 12 along the length of the guide tube 18. The tubes 18 and 20 are clamped in suitable end frames 22 and 24 which may be mounted on suitable support members indicated at 26 and 28 as shown in FIGS. 1 and 2.

Traversing movement of the head 14 across the width of the sheet 10 is actuated when required by means of an electric motor 30 which drives the head through suitable mechanical coupling means including a drive 32 attached to the traversing carriage. The motor driven drive chain (not seen) is returned through one of the hollow tubes 18 or 20 to the opposite end of the supporting frame and attached to the opposite end of the traversing carriage in the same manner in which it is attached. In this fashion the head 14 may be driven to any desired measuring point across the width of the sheet 10. The frame extends a sufficient distance beyond the end of the sheet 10 in the direction of the housing 24 so that the head 14 may also be driven to an off-sheet position over a standardizing flag 36. The flag 36 is fastened to a suitable bracket 38 adjustably secured to the fixed support member. The vertical spacing of the flag 36 may be adjusted with respect to the off-sheet position of the head 14 in order to obtain an optimum air gap distance between the plate 36 and the head 14 — when the latter is in the off-sheet position. The flag 36 provides the standard reflecting surface upon which the gauge is periodically standardized. Accordingly, in FIGS. 1 and 2, the power driven traversing mount carrying the source and detector assembly 15, 19 or head 14, respectively is moved laterally to an off-sheet position at one side of the travelling material web and positioned over a standardizing flag for standardization.

However, when the gauge is used in connection with an industrial process wherein the material flows for long periods of time through the machine in an uninterrupted web, the base reflector such as roll 12 would be continuously covered by the measured sheet. In many instances where a single fixed measuring position of the head is entirely adequate, the expense of providing the motorized traversing mount and automatic positioning apparatus merely to facilitate standardization is not always justified. Secondly, the time required to move the gauging head off sheet and perform the standardizing step and return to the measuring position represents lost measuring time, which is highly undesirable in modern quality-controlled manufacturing processes. This is easily understood when it is realized that for each minute that measurement is suspended, several hundreds or thousands of feet of material may run through a fast process machine, unmeasured and uncontrolled. A further problem arises due to the fact that ambient conditions of temperature, atmosphere, etc., are different in the off-sheet position as opposed to the regular measuring position of the inspection head, contributing to the possibility of standardization error.

There is shown in the preferred embodiment of FIG. 3 an infrared source detector head 14 with a vane 43 movable over the normal exit aperture 45. The flag 36 the embodiments of FIGS. 1 and 2 and the vane 43 in the arrangement of FIG. 3 that reflects or scatters the infrared radiation is identical in its reflection characteristics to the material being measured. For instance when measuring polyethylene film the vane 43 comprises a black metal with a polyethylenecoating. When the vane is moved into a closed position, the black metal of course precludes the passing of the radiation through the vane and striking the material being measured. The radiation which is reflected from the front surface of the polyethlenecoating is detected and used to standardize the gauge. It has been found, however, that other materials may be utilized to provide the desired reflection characteristics.

In standardization practice the vane 43 is positioned over the exit aperture 45 relative to the source 15 and detector 19 to obtain a signal at the detector 19 (by reflection of the reference and absorption signals from the front surface of the vane) which is similar to the signal level received at the detector 19 when the vane is not positioned over the exit aperture during normal measurement conditions.

With continued reference to FIG. 3 the gauge head 14 comprises source 15 and detector 19 positioned relative to one another to receive the reflected and scattered radiation as described above. Positioned over the head 14 is an actuator housing 41 generally having a cup shape and adapted to be positioned over the head 14 to preclude any light or radiation to enter the head 14 when the vane 43 is in a closed position. Adjacent the end-flat portion of the housing 41 is the plastic sheet material being measured. That is, the head 14 together with the housing 41 are positioned directly over the material being tested. The numeral 12 can be a roller on which the material to be tested is transported or can itself be the material to be tested. For blown plastic film, numeral 12 depicts the cross-section of a plastic film bubble.

Figure 5:
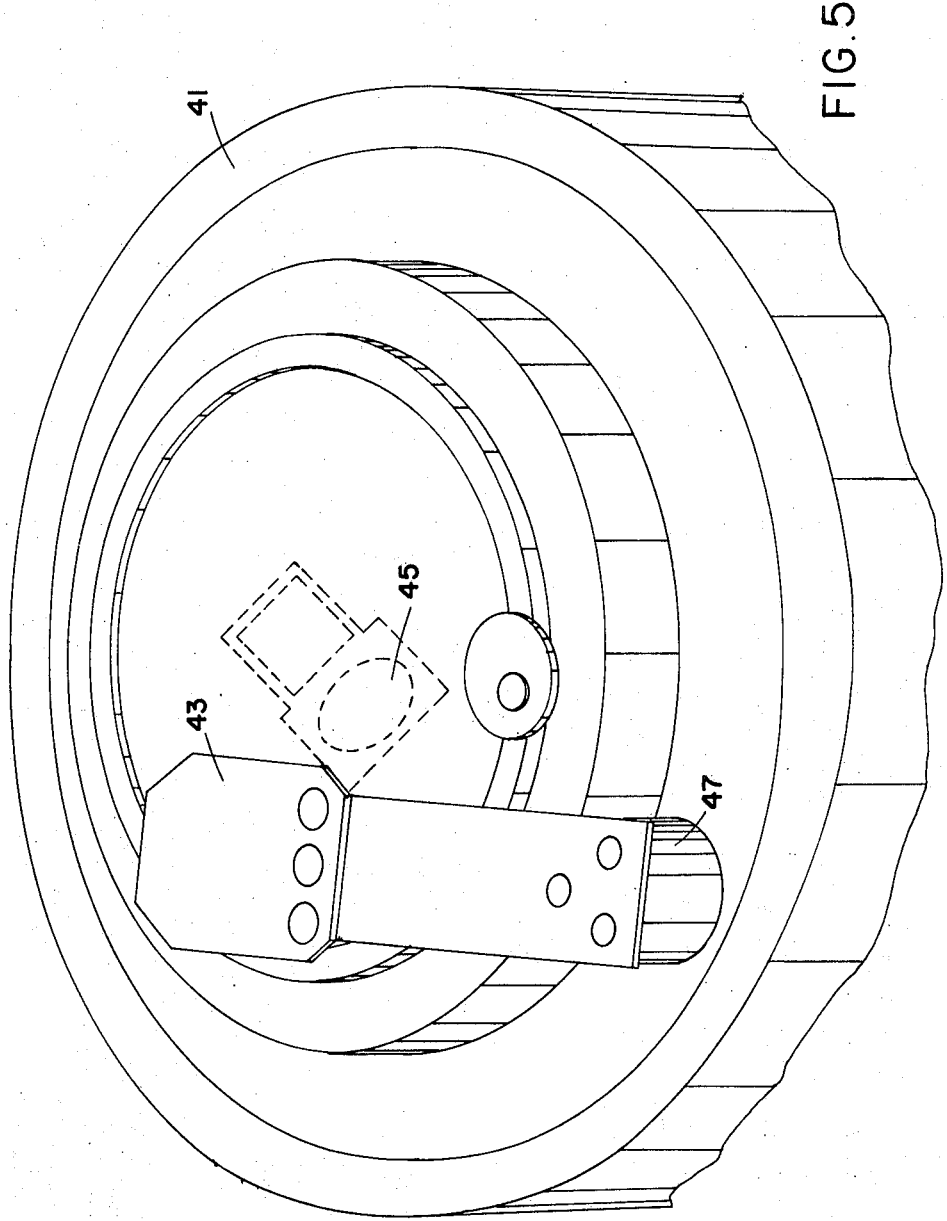
FIG. 5 is a perspective view of the vane and shutter apparatus of a preferred embodiment.

With reference now to FIG. 5 there is shown schematically an actual working embodiment of a vane and shutter arrangement. The vane 43 is mechanically linked to a drive 47 and servo 49 (FIG. 3) to move from an open to a closed position over the exit aperture 45 in the housing 41. Under normal operating conditions the vane 43 is positioned away from the exit opening to thereby permit the infrared radiation to be directed to the material. Periodically to automatically standardize the gauge the vane 43 is positioned over the aperture and the gauge is standardized as aforesaid.

FIG. 4 is a schematic of preferred circuitry to effect the automatic standardization of the gauge. When the gauge is being operated in normal measurement mode, the received absorption and reference pulses are amplified by variable-gain amplifier 59 and then separated by logic switch $S_2$. The reference pulse is applied directly to differential integrator 51.

The switch $S_3$ is closed when switch $S_2$ is in the top position shown. The integrator 51 is applied to the output of summing node at the input of integrator 57 and compared with a reference voltage. The difference is applied to integrator 57 and it develops an error signal which is then fed back to the gain control input of amplifier 59. The gain of this amplifier is adjusted to maintain the integrated value of the reference pulse constant at the output of integrator 51.

When the absorption pulse arrives, switch $S_2$ is in the bottom position and switch $S_3$ is open. The absorption pulse is amplified at amplifier 59 and passes through inverting amplifier 53. Integrator 51 is at this time holding the value of the integrated reference pulse, and now integrates the inverted absorption pulse. At the end of the integrating interval, integrator 51 has a value equal to the difference in energy of the reference and absorption pulses. This difference is passed to the output $V_0$ where it is displayed as the measurement of film thickness. The integrator 51 is then reset by conventional means to await the next sequence of reference and absorption pulses.

During the standardization mode, the vane 43 (FIG. 3) moves over the exit aperture 45, and the reference and absorption signals are reflected off of the reflective back surface of the vane and received by the detector 19. Because only these reflected signals are received, the level of both the reference and absorption pulses applied to the amplifier 59 should be equal.

Switch $S_1$ is closed during movement of vane 43 and the integrated difference of the reference and absorption pulses is sampled. This sampling is performed by integrator 55. The resistance $R_3$ permits the addition of a bias signal to this difference signal to compensate for slight changes in the received signals caused by the position of the vane during standardization in contrast to the position of the film during normal measurements. If the difference between the reference and absorption pulses (plus the bias of $R_3$) is not equal to zero, integrator 55 develops an error signal.

Amplifier 53 is a variable gain amplifier and its gain control input is connected to the output of integrator 55. If there have been any changes to the system since the last standardization which cause an error signal to be generated at the output of integrator 55, the gain of amplifier 53 is adjusted accordingly. The level of the absorption signal is thereby varied until the input of integrator 55 returns to zero. Once this occurs the system has been standardized. When the system returns to the normal measurement mode, the output signal $V_0$ is now an accurate measurement of film thickness because any output error which may have been produced by changes to the system have been eliminated by standardization.

What is claimed is:

1. A reflection-type infrared measuring system for measuring a property of a moving material and having a standardization capability comprising:
   a. a measuring head designed to be positioned on one side of said material for making measurements and having:
      1. a source of radiation in the infrared band, and
      2. a detector positioned relative to said source to receive infrared radiation returned from such material and provide an electrical output in response thereto,
   b. a vane movably-mounted with respect to said head, said vane having a first position out of the path followed by the radiation during measurement of the material property, and a second position in such path which prevents the radiation from striking such material, [and a reflective surface having similar reflection characteristics as that of the material being measured] said vane constructed of:
      1. a reflective material made of the same or similar material as that of the material which is to be measured, and having a surface reflective to infrared radiation for returning infrared radiation toward said detector when said vane is in said second position, and
      2. an infrared absorptive material which absorbs essentially all infrared energy which is not reflected off of said surface of the reflective material and which enters the vane,
   c. means for moving said vane from said first position to said second position, and
   d. means for processing the output of said detector to obtain a measurement of the material property when said vane is in said first position, said processing means additionally including:
      1. means operative when said vane is in said second position for standardizing said measuring system against error-producing changes therein in response to the infrared radiation returned to the detector from the reflective surface of the vane.

2. A system as claim in claim 1 wherein:
   a. said absorptive material is a black metal, and
   b. said reflective material is a coating formed on said black metal.

3. A system as claimed in claim 1 wherein:
   a. said infrared measuring system is of the dual-beam type in which first and second beams of infrared radiations are derived from said source at different wavelengths with the wavelength of the first beam selected to exhibit more absorption with respect to the material property than the wavelength of the second beam, the first wavelength being the absorption beam and the second wavelength being the reference beam, and
   b. said processing means, when said vane is in said first position, providing a measurement of said material property based upon the relative levels of the detected absorption and reference beams.

4. A system as claimed in claim 3 wherein said standardization means includes:
   a. means for comparing the level of the detected absorption beam with the level of the detected reference beam, and
   b. means for adjusting the detected level of one of said beams if the results of the comparison is greater than a predetermined value.

5. A system as claimed in claim 4 further comprising:
   a. a housing containing said measuring head, said housing being designed to be placed closely adjacent to said material when making measurements and having:
      1. an aperture formed therein for permitting the exit of radiation from said source and the return of radiation to said detector from said material, and
   b. means for mounting said vane on said housing adjacent to said aperture, said vane when moved by said moving means into said second position preventing the exit of radiation from said aperture.

* * * * *

UNITED STATES PATENT OFFICE
CERTIFICATE OF CORRECTION

Patent No. 3,803,414                    Dated April 9, 1974

Inventor(s) William E. Van Horne; Paul Williams

It is certified that error appears in the above-identified patent and that said Letters Patent are hereby corrected as shown below:

Claim 1, subparagraph b, delete "[and a reflective surface having similar reflection characteristics as that of the material being measured]".

Signed and sealed this 29th day of April 1975.

(SEAL)
Attest:

RUTH C. MASON
Attesting Officer

C. MARSHALL DANN
Commissioner of Patents
and Trademarks